United States Patent
Hussain

(10) Patent No.: US 12,159,138 B2
(45) Date of Patent: Dec. 3, 2024

(54) HARDWARE ACCELERATOR

(71) Applicant: Nordic Semiconductor ASA, Trondheim (NO)

(72) Inventor: Waqar Hussain, Trondheim (NO)

(73) Assignee: Nordic Semiconductor ASA, Trondheim (NO)

( * ) Notice: Subject to any disclaimer, the term of this patent is extended or adjusted under 35 U.S.C. 154(b) by 0 days.

(21) Appl. No.: 18/018,227

(22) PCT Filed: Jul. 14, 2021

(86) PCT No.: PCT/EP2021/069638
§ 371 (c)(1),
(2) Date: Jan. 26, 2023

(87) PCT Pub. No.: WO2022/023044
PCT Pub. Date: Feb. 3, 2022

(65) Prior Publication Data
US 2023/0289182 A1   Sep. 14, 2023

(30) Foreign Application Priority Data
Jul. 31, 2020  (GB) ..................................... 2011959

(51) Int. Cl.
*G06F 9/30* (2018.01)
*G06F 9/38* (2018.01)
*G06F 15/78* (2006.01)

(52) U.S. Cl.
CPC ........ *G06F 9/3001* (2013.01); *G06F 9/30134* (2013.01); *G06F 9/3877* (2013.01); *G06F 15/7867* (2013.01)

(58) Field of Classification Search
None
See application file for complete search history.

(56) References Cited

U.S. PATENT DOCUMENTS

| | | | |
|---|---|---|---|
| 6,513,108 B1 | 1/2003 | Kerr et al. | |
| 7,499,519 B1 * | 3/2009 | Hsieh ..................... | G11C 19/00 377/67 |

(Continued)

FOREIGN PATENT DOCUMENTS

CA    3120684 A1 *  5/2020   ........... G06F 13/364

OTHER PUBLICATIONS

'A New Low Power and High Speed Bidirectional Shift Register Architecture' by N. Sklavos et al., 2001. (Year: 2001).*

(Continued)

*Primary Examiner* — Steven G Snyder
(74) *Attorney, Agent, or Firm* — Klarquist Sparkman, LLP

(57) ABSTRACT

A hardware accelerator comprises a direct memory access (DMA) system and an array of processing elements (PEs). Each PE comprises two data inputs and two data outputs and can perform a selectable logical or arithmetic operation. The array comprises configurable interconnects for selectively connecting outputs of the PEs to inputs of the PEs. A first data buffer comprises two or more first-edge cyclic registers, for connecting the DMA system to selected data inputs at a first edge of the PE array. A second data buffer comprises two or more second-edge linear or cyclic shift registers, for connecting selected data outputs of a second edge of the PE array to the DMA system.

20 Claims, 10 Drawing Sheets

(56) References Cited

U.S. PATENT DOCUMENTS

| | | | |
|---|---|---|---|
| 11,232,347 B2* | 1/2022 | Lie | G06N 3/044 |
| 12,007,937 B1* | 6/2024 | Huang | G06F 15/8046 |
| 2014/0143470 A1 | 5/2014 | Dobbs et al. | |
| 2019/0095776 A1* | 3/2019 | Kfir | G06F 12/0207 |
| 2019/0311243 A1 | 10/2019 | Whatmough et al. | |
| 2020/0159809 A1* | 5/2020 | Catthoor | G06N 3/045 |
| 2020/0167309 A1 | 5/2020 | Nicol | |
| 2020/0380341 A1* | 12/2020 | Lie | G06F 9/30014 |
| 2020/0409709 A1* | 12/2020 | ChoFleming | G06F 16/9024 |
| 2021/0011971 A1* | 1/2021 | Lai | G06F 17/16 |

OTHER PUBLICATIONS

Hussain, "Design and Development from Single Core Reconfigurable Accelerators to a Heterogeneous Accelerator-Rich Platform," Thesis, Tampere University of Technology, Nov. 27, 2014, 162 pages.

IPO Search Report under Section 17(5) for GB2011959.0, mailed Dec. 8, 2020, 3 pages.

International Search Report and Written Opinion for PCT/EP2021/069638, mailed Oct. 26, 2021, 17 pages.

Kiningham et al., "Design and Analysis of a Hardware CNN Accelerator," Stanford University, 2016, 8 pages.

Nouri et al., "Evaluation of a Heterogeneous Multicore Architecture by Design and Test of an OFDM Receiver," *IEEE Transactions on Parallel and Distributed Systems*, vol. 28, No. 11, Nov. 2017, pp. 3171-3187.

\* cited by examiner

HARDWARE ACCELERATOR

CROSS REFERENCE TO RELATED APPLICATIONS

This is the U.S. National Stage of International Application No. PCT/EP2021/069638, filed Jul. 14, 2021, which was published in English under PCT Article 21(2), which in turn claims the benefit of Great Britain Application No. 2011959.0, filed Jul. 31, 2020.

BACKGROUND OF THE INVENTION

This invention relates to a hardware accelerator having an array of processing elements.

General purpose processors are extremely versatile but can be slow and energy-inefficient when performing certain signal-processing tasks such as computing fast Fourier transforms (FFT). Digital signal processors (DSPs) can be faster but still consume substantial energy; they also occupy a relatively large area of silicon, making them costly. Fixed digital logic (e.g. application-specific integrated circuits) can be fast, efficient and compact, but is inflexible, being able to provide only one fixed task.

To mitigate these issues, it is known to provide a hardware accelerator comprising a reconfigurable array of relatively-simple hardware processing elements (PEs). For instance, an array may have 64 PEs, logically arranged in a 4×16 rectangular array. Each PE can have a number of data inputs (e.g. two inputs) and a number of data outputs (e.g. two outputs), and be dynamically configurable to perform a selected logical or arithmetic operation on its input data. Configurable interconnects enable the output of one PE to be selectively connected to an input of another PE. Data can be input to the PEs along a first (e.g. top) edge of the array, clocked through the PE array, from one PE to the next over a number of clock cycles, and output along a second (e.g. bottom) edge of the array. Dedicated local memory banks can be located adjacent the two edges for rapid input and output of data through the array.

After the PE operations and interconnects have been appropriately configured (e.g. by loading configuration data from a configuration file), the hardware accelerator can then perform a complex sequence of operations, such as an FFT or complex cross-correlation, on data stored in one of the local memory banks, outputting the results to the other local memory bank.

The hardware accelerator may be provided as a co-processor on a system-on-chip (SoC), integrated with one or more general purpose processors. The hardware accelerator may comprise a direct-memory-access (DMA) unit for transferring the input and output data between the local memories of the hardware accelerator and a system memory that is accessible to the general purpose processors. The DMA unit can also be used to read new configuration data into the accelerator.

Such hardware accelerators can provide significant performance advantages for certain repetitive processing tasks. However, the present inventor has identified an improvement that has the potential to provide even better performance.

SUMMARY OF THE INVENTION

From a first aspect, the invention provides a hardware accelerator comprising:
  a direct memory access system for transferring data between the hardware accelerator and a system memory;
  an array of processing elements, each processing element comprising two data inputs and two data outputs and being configured to perform a selectable logical or arithmetic operation on input data received at one or more of the data inputs to generate output data at one or more of the data outputs, wherein the array comprises a set of two or more first-edge processing elements along a first edge of the array and a set of two or more second-edge processing elements, different from the first-edge processing elements, along a second edge of the array;
  configurable interconnects for selectively connecting respective outputs of the processing elements to respective inputs of the processing elements;
  a first data buffer comprising two or more first-edge cyclic registers, each first-edge cyclic register comprising a plurality of chained flip-flops including a proximal flip-flop and a distal flip-flop, wherein the distal flip-flop of each first-edge cyclic register is arranged for receiving data from the direct memory access system, and wherein the proximal flip-flop of each first-edge cyclic register is selectively connectable to a data input of a respective one of the first-edge processing elements; and
  a second data buffer comprising two or more second-edge shift registers, each second-edge shift register comprising a plurality of chained flip-flops including a proximal flip-flop and a distal flip-flop, wherein the proximal flip-flop of each second-edge shift register is selectively connectable to a data output of a respective one of the second-edge processing elements, and wherein the distal flip-flop of each second-edge shift register is arranged for outputting data to the direct memory access system.

From a second aspect, the invention provides an integrated-circuit chip comprising such a hardware accelerator.

The integrated-circuit chip may comprise said system memory. It may comprise a bus system connecting the system memory to the direct memory access (DMA) system of the hardware accelerator. It may further comprise a general-purpose processor, distinct from the hardware accelerator. It may be a system-on-chip device.

Thus it will be seen that, in accordance with the invention, the array-based hardware accelerator uses a data buffer of cyclic registers for clocking input data into the array of processing elements, along a first edge of the array (e.g. a top edge). Output data can be clocked out using a set of shift registers arranged along a second edge (e.g. a bottom edge). The ability to cycle at least some of the input data around so that the same input data enters the array multiple times, can enable the efficient implementation of a range of processing tasks.

For example, in at least some embodiments, the hardware accelerator may be configured for performing an efficient cross-correlation operation between a template signal pattern (e.g. representing a fixed preamble in a radio communications system) and a longer incoming data stream (e.g. received radio signals). In this example, a set of fixed coefficients representing the template signal pattern may be loaded once into one or more cyclic registers and then cycled around repeatedly as the array calculates a succession of dot product operations between the fixed coefficients and the incoming data stream.

More generally, whenever the same input data is to be processed multiple times, the cyclic registers can potentially provide greater efficiency than shift registers having no feedback path, by reducing the need to load the same data repeatedly through the DMA of the hardware accelerator.

The use of cyclic registers also allows a more compact implementation than using a local memory bank (e.g. a row-and-column-addressed register file) to hold data for loading into the array, as the cyclic register does not require complex addressing logic for moving data into the processing array. Instead, the outputs of the proximal flip-flops may be coupled directly to the inputs of the selected processing elements. This is particularly well-suited to digital signal processing (DSP) applications, where random data read and write capabilities are generally not required.

The second-edge shift registers could be linear (i.e. non-cyclic) shift registers in some less-preferred embodiments, but in preferred embodiments they, too, are cyclic registers.

Each first-edge cyclic register preferably comprises a respective first feedback path, such that cycling data round each first-edge cyclic register comprises: moving data from the distal flip-flop to the proximal flip-flop along successive flip-flops of the plurality of chained flip-flops, and moving data from the proximal flip-flop to the distal flip-flop along the first feedback path. In some embodiments, the first-edge cyclic registers can be controlled (e.g. using configuration data set at run-time) to cycle data round the register or not to cycle data. In some embodiments, each cyclic register can be independently (i.e. separately from the other cyclic registers) controllable to cycle or not cycle. In some embodiments, the hardware accelerator may be arranged such that a configurable subset of one or more registers of the first and/or second data buffers (which are preferably all cyclic registers) can be enabled for shifting, while some or all of the registers of the remaining first and/or second data buffers (i.e. those not in the subset) are not shifted (i.e. their contents remain static when the enabled registers are shifted). The configurable subset may be specified by configuration data, and may be changed dynamically even within an operation. Such arrangements can support the performance of operations, such as cross-correlations, in which values contained in one register are shifted relative to values in another register of the same data buffer between successive stages of the operation.

The first-edge cyclic registers may be unidirectional but, in preferred embodiments, they are bidirectional. The proximal flip-flop of each first-edge cyclic register may be selectively connectable (e.g. by a configurable switch which can be configured to be open or closed) to a data output of a respective one of the first-edge processing elements, and the distal flip-flop of each first-edge cyclic register may be arranged for outputting data to the direct memory access system. In addition to comprising a first feedback path, for passing data directly from the proximal flip-flop to the distal flip-flop, each first-edge cyclic register may further comprise a second feedback path that may allow data to pass directly from the distal flip-flop to the proximal flip-flop.

Thus, in some embodiments, each of the first-edge cyclic registers is bidirectional, and can be independently controlled to shift forwards, shift backwards or not to shift. This can facilitate efficient inputting of data into the processing elements. For example, when a template vector, stored in a first cyclic register, is to be applied repeatedly in a cross-correlation operation to a signal vector stored in a second cyclic register, but the template vector occupies less than half the number of chained flip-flops in the first cyclic register, the template values may be shifted and cycled round in a forward direction to the processing elements for performing a first correlation step, and then shifted and cycled back in a reverse direction, away from the processing elements, in preparation for being shifted forwards again in a next correlation step. For a longer template vector, however, it may be more efficient to cycle the template values round only in a forward direction at each successive correlation step. The ability to reconfigure embodiments for different shifting behaviour depending on requirements provides versatility to support different modes of use.

The second-edge shift registers are preferably bidirectional. The distal flip-flop of each second-edge cyclic register may be arranged for receiving data from the direct memory access system, and the proximal flip-flop of each second-edge cyclic register may be selectively connectable to a data input of a respective one of the second-edge processing elements.

Thus, in some embodiments, the array may be configured to process data flowing through the array from the first edge to the second edge in a first configuration (e.g. at a first time), and from the second edge to the first edge in a second configuration (e.g. at a second time).

In some embodiments, the second-edge shift registers are also cyclic registers, and may each comprise a first feedback path for passing data directly from the proximal flip-flop to the distal flip-flop of the cyclic register. This can allow input data to be cycled round and input to the second edge of the processing array multiple times without having to load the data into the second-edge shift registers more than once. The second-edge cyclic registers may be bidirectional, and may each comprise a second feedback path for passing data directly from the distal flip-flop to the proximal flip-flop of the cyclic register. In some embodiments, each of the first-edge and second-edge cyclic registers is bidirectional and can be independently controlled to shift or not shift. Such embodiments provide a large degree of flexibility in how they can be configured and controlled to support a range of usage scenarios—e.g. by first configuring all the cyclic registers to shift forwards, and then, after a number of clock cycles, reconfiguring the buffers so that a subset of the cyclic registers shift backwards, or don't shift at all, while the remaining registers continue to shift forwards on successive clock cycles.

In some embodiments, the proximal flip-flop of each first-edge cyclic register and/or of each second-edge cyclic register (and not only the distal flip-flops) is arranged for receiving data from the direct memory access system. This connection may be switchable for each cyclic register (i.e. can be selectively enabled or disabled) based on configuration data (as, also, the connection from the DMA system to each of the distal flip-flops of the first and/or second cyclic registers). This can provide greater flexibility and efficiency in loading (i.e. injecting) data into the data buffers—e.g. if fewer than 32 values are to be loaded into a particular cyclic register, they can be loaded from the proximal end to avoid having to shift them along the particular register from the distal end towards the array.

The data inputs and data outputs of the processing elements are preferably multi-bit (e.g. for receiving and outputting 16-bit or 32-bit words). Each shift and cyclic register in the first and second data buffers preferably comprises a multi-bit register chain—e.g. comprising sixteen or thirty-two parallel single-bit flip-flop chains, for storing a multibit value at each link of the chain.

The first-edge cyclic registers may all have the same number of registers (i.e. a common chain length)—e.g. each comprising thirty-two 16-bit registers in a chain. The second-edge cyclic registers may all have a common chain length, which may be the same as the length of the first-edge cyclic registers—e.g. each having 32 registers.

There may be at least as many first-edge cyclic registers as there are data inputs to the first-edge processing elements. There may be at least as many second-edge cyclic registers as there are data outputs from the second-edge processing elements. This can enable fully parallel data flow into and out of the array.

In some embodiments, each processing element has exactly two data inputs and two data outputs. In this case, there may be twice as many first-edge cyclic registers as there are first-edge processing elements, and twice as many second-edge cyclic registers as there are second-edge processing elements.

The first and second edges may be opposite edges. They may have the same number of processing elements.

The array of processing elements may have any logical shape (e.g. hexagonal), but, in some embodiments, it is a rectangular array (e.g. a square array). The second edge may be parallel to the first edge. The logical structure of the array can have particular significance where, as in some embodiments, it is not possible to connect every PE output to every PE input, but, instead, each PE input can be connected to a PE output in a neighbourhood of the PE input (and optionally to one or more further PE outputs for some PE's, such as by a feedback path from the second edge to the first edge), but not to every PE output. Such a limitation can be desirable for reducing the size and complexity of the configurable interconnect system. A neighbourhood of a PE may be smaller than the whole array. In some embodiments, each PE in the array can receive data from all the PEs in a neighbourhood of the respective subject PE, wherein the neighbourhoods all have a common shape (e.g. all being 3×3 squares centred on the respective PEs). Of course, the number of PEs in the neighbourhood may reduce towards one or more edges of the array, due to boundary effects (e.g. with a 3×3 square window including only 2×3=6 PEs when the subject PE is on an edge of the array, and only 2×2=4 PEs when it is at the very corner of the array). The neighbourhoods could have any common shape and need not necessarily be rectangular; they may or may not be centred on a subject PE, and may or may not include the subject PE. The interconnect system may also support connections to one or more further PEs that are not part of a common neighbourhood.

In some embodiments, in which the array is rectangular and configured to receive input data at an input edge, a neighbourhood of switchable connections for a subject PE may comprise any one or more of:
  the subject PE itself (i.e. allowing feedback from an output of the PE to one of its own inputs);
  one or both of two PEs that neighbour the subject PE and are at the same distance from the input edge as the subject PE (e.g. to the immediate left or right of the subject PE, when the input edge is the top edge);
  a neighbouring PE located one step (i.e. one position further along a row or column of the array) directly towards the input edge from the subject PE (e.g. immediately up, when the input edge is the top edge);
  one or both of two PEs that are displaced diagonally from the subject PE by being one step towards the input edge from the subject PE and one step away from the subject PE in a direction parallel to the input edge (e.g. diagonally up and left, or diagonally up and right, when the input edge is the top edge);
  a PE that is two steps directly towards the input edge from the subject PE (e.g. two positions immediately up, when the input edge is the top edge); and
  one or both of two PEs that are displaced diagonally from the subject PE by being two steps towards the input edge from the subject PE and one step away from the subject PE in a direction parallel to the input edge (e.g. two rows closer to the top edge, and one step to the left or right).

In some embodiments, at least one PE in the array is able to receive input from all nine PEs in such a neighbourhood of the PE. In some embodiments, at least one PE in the array can receive input only from these nine PEs. In some embodiments, every PE in the array is able to receive input from up to all nine PEs in such a respective neighbourhood of the PE, where such PE outputs exist (i.e. subject to edge constraints for PEs near the edges of the array), If the array is bidirectional, when data is moving in the opposite direction, the neighbourhood may consist of the same first three of these PE's, plus six further PE's towards the opposite edge. Thus the interconnect system may support connections from a subject PE to a total of at least fifteen PEs (including the subject PE itself).

In some embodiments, the configurable interconnects are arranged such that each first-edge PE is additionally able to receive an output from any second-edge PE (in addition to being able to receive input from the first data buffer). This can enable a result to be fed back directly from the second (output) edge of the array back to the first (input) edge, without having to reverse the direction of flow through the array or having to use the buffers and DMA to move the result back round from the output edge to the input edge. This can provide extra flexibility and enable the array to support more different calculations. The configurable interconnects may further be arranged such that each second-edge PE is additionally able to receive an output from any first-edge PE (in addition to being able to receive input from the second data buffer), for when data is flowing in the opposite direction—i.e. from the second edge to the first edge.

In some embodiments, the array is a rectangular array and the configurable interconnects are arranged such that each PE along a third edge of the array, perpendicular from the first and second edges, is additionally able to receive (at one input, or at any of two or more different inputs) an output from a respective PE along a fourth edge of the array, parallel to the third edge. In particular, each subject PE along the third edge may be able to receive an output from the respective PE that is on the fourth edge and that is positioned one step (i.e. one row or column) closer to the input edge than the subject PE is. In some embodiments, this is the only respective fourth-edge PE from which each third-edge PE is able to receive an output. Each fourth-edge PE may similarly be able to receive (at one input, or at any of two or more different inputs) an output from a respective third-edge PE, which may be the PE on the third edge that is one step (i.e. one row or column) closer to the input edge than is the respective fourth-edge PE, and potentially from no other third-edge PEs. Such connections may be useful for efficiently implementing operations such as finite impulse response (FIR) or infinite impulse response (IIR) filtering.

The system memory may comprise RAM and/or non-volatile memory such as flash memory. The DMA system may comprise one or more DMA scatter-gather units. In some embodiments, the DMA system comprise an incoming DMA unit for reading data from the system memory (e.g. from RAM) and an outgoing DMA unit for writing data to the system memory (e.g. to RAM). The DMA system may additionally be arranged to read configuration data from the system memory, for configuring the array of processing elements. In some preferred embodiments, the DMA system is dedicated to the hardware accelerator; however, in other embodiments, it may be a shared DMA controller which may also be configured for transferring data between the system memory and one or more other peripherals.

In some embodiments, each PE has exactly two data inputs. Each PE may have exactly two data outputs. The data inputs and outputs may all be the same bit length. Each data input may be a 16-bit input. Each data output may be a 16-bit output.

Each processing element (PE) may comprise (e.g. be associated with) a respective configuration memory (e.g. a register file) and be configured to determine what logical or arithmetic operation to perform on input data received at one or more data inputs in dependence on configuration data stored in the configuration memory. Each PE may be configured to perform any one or more of: addition, subtraction, multiplication, division, left shift, right shift, logical negation, and XOR, AND, OR and NOT operations. The configuration memory may be sized to store configuration data identifying exactly one respective operation for each data output of the PE; i.e. new configuration data must be loaded to the PE before it can perform a different operation.

Each PE may comprise an immediate register for storing an immediate value (i.e. a constant value) for use in one or more operations on one or more inputs, such as addition to the immediate value and/or multiplication by the immediate value. The immediate value may be loaded to the PE at the same time as the configuration data is loaded to the configuration memory.

Each PE may be selectively configurable to perform a NOP or no-operation (i.e. a delayed output of the unchanged input data) operation, which may have a latency equal to the latency of one or more, or all, of the logical and/or arithmetic operations (e.g. two clock cycles). The PE may support two or more no-operation (NOP) operations, which may have different latencies—e.g. a first NOP having a two-cycle latency, and a second NOP (which may be referred to as a feed-through operation), which also outputs the input data unchanged and which has a latency of one clock cycle. In other words, in some embodiments, each processing element can be configured to receive a value at a data input of the processing element and to output the value at a data output of the processing element after a delay that can be configured to have one of two different durations. This can provide greater versatility in controlling the flow of data through the array.

In some embodiments, each PE can perform a different respective operation for each of its outputs. In particular, a PE may provide an option to output an addition of two inputs at a first output, and simultaneously to output a difference (subtraction) of the same two inputs at a second output. This can enable particularly efficient implementation of certain operations, such as a radix-2 FFT butterfly. Similarly, in some embodiments, a PE may provide an option to output the maximum of two inputs at a first output, and simultaneously to output the minimum of the same two inputs at a second output.

In some embodiments, each PE is configured to selectively perform a combined multiplication and right-shift operation on data received at the two data inputs. It may output the product of the two inputs, shifted right by a predetermined number of bits, at one of the data outputs. This may be particularly beneficial when the data output is the same size as the data inputs (e.g. all being 16 bits long), as it can allow two values to be multiplied that would normally overflow the data output without the loss of the most significant bits of the answer. The size of the right shift may be determined by a value loaded in an immediate register of the PE.

The hardware accelerator may comprise configuration logic, such as a control unit implementing a state machine, for configuring the processing elements to perform respective logical or arithmetic operations and/or for configuring the configurable interconnects. The hardware accelerator may provide a register interface for receiving instructions, e.g. over a bus, such as from a general-purpose processor. The hardware accelerator may be configured to obtain configuration data for the processing elements and/or for the configurable interconnects through the DMA system or through the register interface.

In some embodiments, each input to each PE can be selectively connected to any one of a respective set of possible sources. The configurable interconnects may comprise a set of lines and a set of multiplexers, wherein each PE input is connected to an output of a respective multiplexer, and wherein each multiplexer is selectively connectable to one of the set of sources. The multiplexers may be controlled by configuration data stored in the configuration memory of the respective PE. The set of sources may include one or more outputs of one or more other PEs in the array. They may include one or more, or all, of the proximal flip-flops of the first-edge or second-edge registers. The possible sources may include one or more outputs of the selfsame PE—i.e. an immediate feedback path; this may be useful when implementing iterative operations. However, in some embodiments, a feedback path for a PE is instead implemented within the PE itself (rather than passing through a multiplexer). This may potentially allow data to be fed back more quickly—e.g. within a single cycle.

In some embodiments, each proximal flip-flop of the first-edge cyclic registers and of the second-edge cyclic or shift registers is permanently arranged for receiving data from a different respective output of a processing element, and from no other outputs. In this way, the interconnect fabric can be straightforwardly configured by selecting the source of the inputs for relevant PEs in the array and the inputs to the relevant registers of whichever data buffer is set to receive data from the array.

In some embodiments, the PEs are logically arranged in a rectangular array and the configurable interconnects are arranged to enable an input of a first PE to be selectively connected to an output of a second PE, wherein the second PE is not one of the eight immediate neighbours of the first PE and is not two places closer to the first edge or second edge of the array in the same row or column as the first PE. In some embodiments, the second PE may be in an adjacent row or column to the first PE and two places closer to the first edge or second edge of the array—i.e. a long diagonal interconnect. In some embodiments, the first PE may be a first-edge PE, and the second PE may be a second-edge PE, or the first PE be a second-edge PE and the second PE may be first-edge PE (i.e. providing an array-feedback path).

In some embodiments, the array comprises exactly sixteen processing elements. They may be logically arranged in a four-by-four square array. Each of the sixteen PEs may have exactly two data inputs and two data outputs. There may be eight cyclic registers in the first data buffer and eight cyclic registers in the second data buffer. This arrangement has been found to be particularly compact yet still supporting a range of using signal-processing operations, including complex correlation, radix-2 FFT butterfly, and impulse response filters.

The hardware accelerator may be implemented on a semiconductor device e.g. a silicon chip. It may be implemented using fixed application-specific hardware logic. However, in some embodiments, it may be implemented at least partly using an FPGA.

An integrated-circuit chip comprising the hardware accelerator may also comprise a memory storing configuration data for the hardware accelerator. The configuration data may, when loaded into the hardware accelerator, cause it to calculate any one or more of: the squared magnitude of the sum of product of complex numbers; a complex dot product; a complex cross-correlation; a radix-2 FFT butterfly calculation; a radix-2 FFT calculation; or any other feasible operation.

Although the DMA unit provides a convenient means for configuring and using the hardware accelerator, some implementations may load data by other means such as a register interface. Thus, from another aspect, the invention provides a hardware accelerator comprising:

an interface for transferring data between the hardware accelerator and a system memory;
an array of processing elements, each processing element comprising two data inputs and two data outputs and being configured to perform a selectable logical or arithmetic operation on input data received at one or more of the data inputs to generate output data at one or more of the data outputs, wherein the array comprises a set of two or more first-edge processing elements along a first edge of the array and a set of two or more second-edge processing elements, different from the first-edge processing elements, along a second edge of the array;
configurable interconnects for selectively connecting respective outputs of the processing elements to respective inputs of the processing elements;
a first data buffer comprising two or more first-edge cyclic registers, each first-edge cyclic register comprising a plurality of chained flip-flops including a proximal flip-flop and a distal flip-flop, wherein the distal flip-flop of each first-edge cyclic register is arranged for receiving data from the interface, and wherein the proximal flip-flop of each first-edge cyclic register is selectively connectable to a data input of a respective one of the first-edge processing elements; and
a second data buffer comprising two or more second-edge shift registers, each second-edge shift register comprising a plurality of chained flip-flops including a proximal flip-flop and a distal flip-flop, wherein the proximal flip-flop of each second-edge shift register is selectively connectable to a data output of a respective one of the second-edge processing elements, and wherein the distal flip-flop of each second-edge shift register is arranged for outputting data to the interface.

Features of any aspect or embodiment described herein may, wherever appropriate, be applied to any other aspect or embodiment described herein. Where reference is made to different embodiments or sets of embodiments, it should be understood that these are not necessarily distinct but may overlap.

BRIEF DESCRIPTION OF THE DRAWINGS

Certain preferred embodiments of the invention will now be described, by way of example only, with reference to the accompanying drawings, in which.

DETAILED DESCRIPTION

Figure 1:
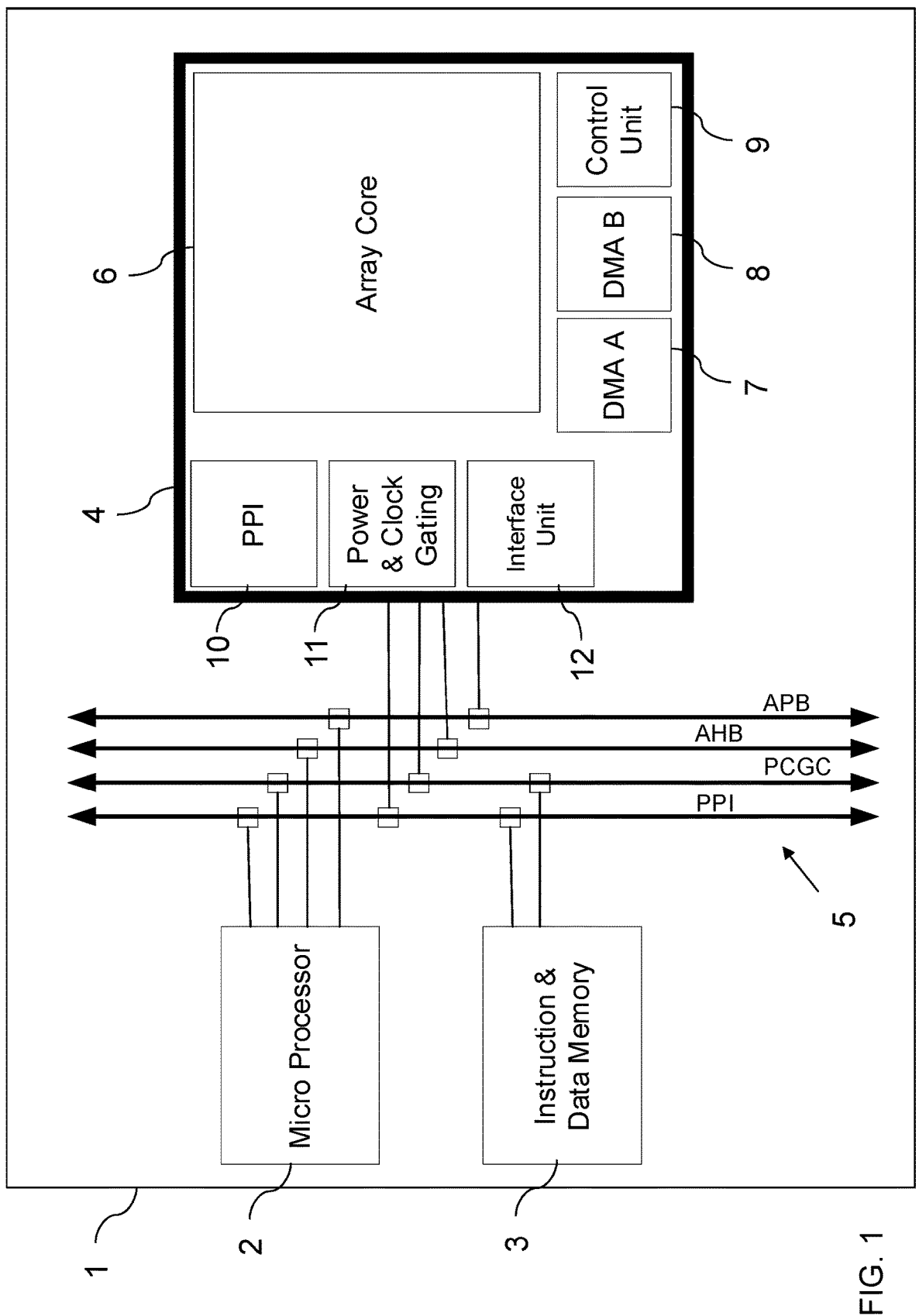
FIG. 1 is a schematic diagram of a system-on-chip comprising a hardware accelerator embodying the invention.

FIG. 1 shows a system-on-chip (SoC) device 1. It comprises a microprocessor 2 (e.g. an Arm™ Cortex-M™ processor), a memory 3 for storing instructions and data (which may include volatile RAM and non-volatile flash), and a hardware accelerator 4. These are interconnected by a bus system 5, which includes an Arm™ Advanced Peripheral Bus (APB), an Arm™ Advanced High-Performance Bus Lite (AHB-lite), a power and clock gating control (PCGC) bus, and a programmable peripheral interconnect (PPI). There are also interrupt lines (not shown) from the accelerator 4 to the processor 2.

The SoC 1 may include other components, such as further processors, DSPs and co-processors (e.g. for cryptographic operations); systems for managing power distribution, clock signals and reset handling; and peripherals, such as a digital radio, input-output modules, timers, etc. These are omitted from FIG. 1 for simplicity. The SoC 1 may have pins or pads for connecting to various external components such as a power supply, crystal resonators, capacitors, resistors, radio antennas, user interfaces, etc.

The hardware accelerator 4 is a general-purpose reconfigurable accelerator for accelerating digital signal processing applications. The design is reconfigurable meaning that its functionality can be switched at run-time to be able to process different algorithms.

It includes an array core 6, comprising an array of processing elements (PEs), a first direct-memory-access (DMA) scatter-gather unit 7 (DMA_A), a second direct-memory-access (DMA) scatter-gather unit 8 (DMA_B), and a control unit 9. It also includes three interface modules: a programmable peripheral interconnect (PPI) unit 10, a power & clock gating unit 11, and an interface unit 12.

The DMA units 7, 8 can read and write to the memory 3 over the AHB-lite, without requiring the involvement of the processor 2. In particular, they can read configuration data for the control unit 9, as well as reading incoming data for processing by the array core 6, and writing out results output by the array core 6. The first DMA unit 7 (DMA_A) is for the transfer of data from the data memory 3 to the array core 6, while the second DMA unit 8 (DMA_B) takes the final result out from the array core 6 to the main memory 3.

The PPI unit 10 is connected to the PPI and enables the accelerator 4 to respond to task signals from other peripherals, and to signal events to other peripherals, e.g. as described in the applicant's earlier application WO 2020/002423.

The power & clock gating unit 11 is connected to the PCGC bus for controlling the gating of power and clock signals into the accelerator 4, so as to reduce power consumption when the accelerator 4 is not active. The accelerator 4 receives three different clock signals: one for the interface unit 12, one for the control unit 9, and one for the array core 6.

The interface unit 12 is used to generate tasks, events and events-based interrupts, and to provide a register interface, accessible over the APB, which allows the processor 2 (and potentially other components) to send compute-related and DMA-based task instructions to the accelerator 4 and to determine status information from the accelerator 4—e.g. for starting or interrupting processing tasks; for enabling or disabling interrupts; for providing addresses in the memory 3 for the DMAs 7, 8 to access; etc.

The control unit 9 provides a state machine for controlling the DMA transfers and a state machine for controlling the computation performed by array core 6. It accesses compute-related information from read/write registers in the interface unit 12.

Figure 2:
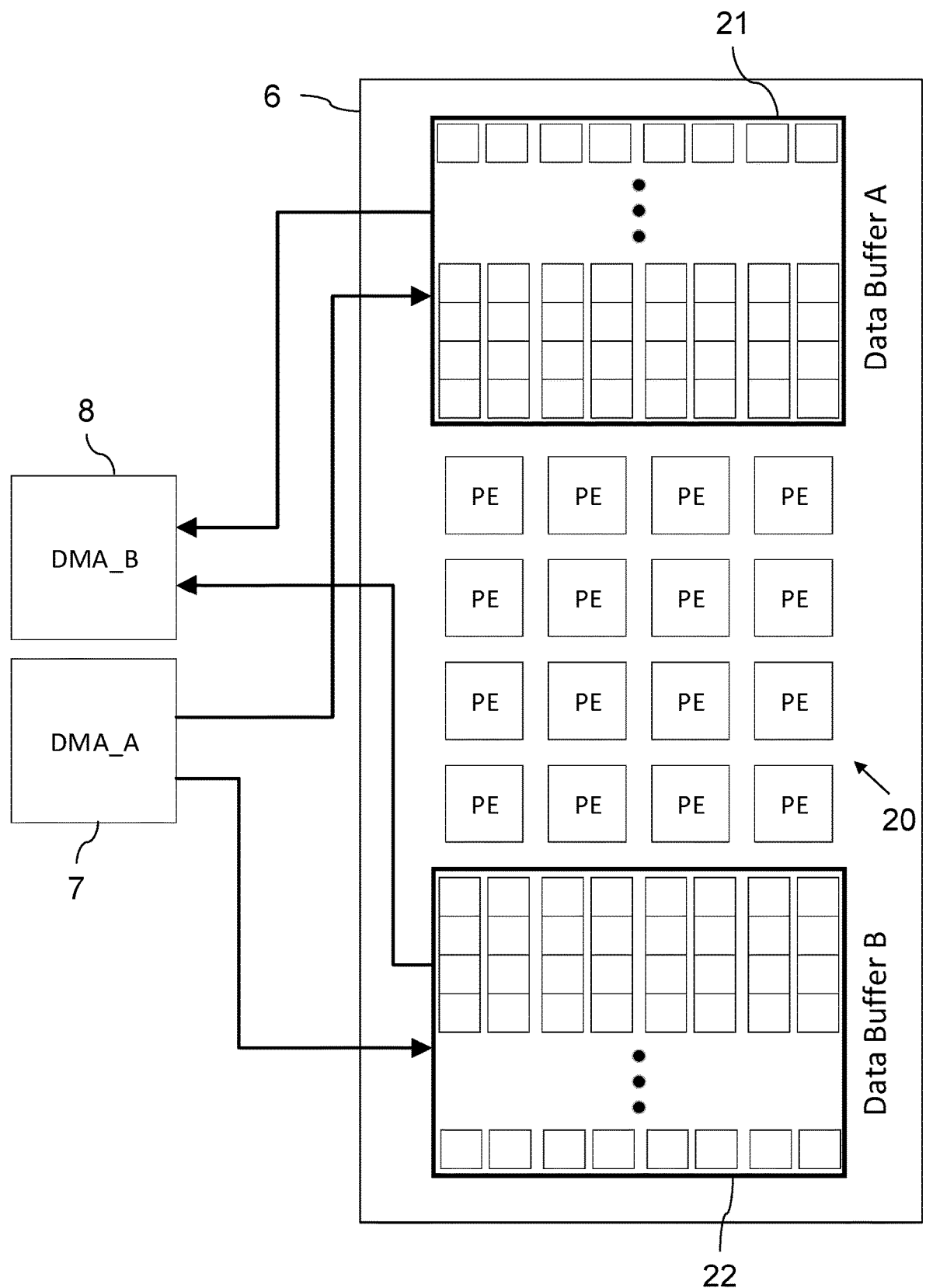
FIG. 2 is a schematic diagram of the hardware accelerator.

FIG. 2 shows the array core 6 in more detail.

The core 6 comprises a 4×4 square array 20 of processing elements (PEs), or compute cells, where a PE is the unit of computation in this structure. Each PE is equipped with its own local configuration memory that can be loaded with configuration data at system start-up time. A new configuration stream can also be loaded at run-time making the design dynamically reconfigurable to switch its functionality for the processing of different algorithms.

The array core 6 comprising the 4×4 PE array 20 is also equipped with a first hardware data buffer 21 (Data Buffer A) adjacent a top edge of the array 20, and a second hardware data buffer 22 (Data Buffer B) adjacent a bottom edge of the array 20. These data buffers 21, 22 supply data to be processed and store intermediate and final results.

Each data buffer 21, 22 is made up of eight 16-bit bidirectional cyclic registers (CR), each thirty-two registers in length. Each PE has two inputs and each of the top and bottom rows consists of four PEs, making a total of eight inputs along each of the top and bottom edges. Eight CRs along each edge therefore provides full parallelism.

Figure 3:
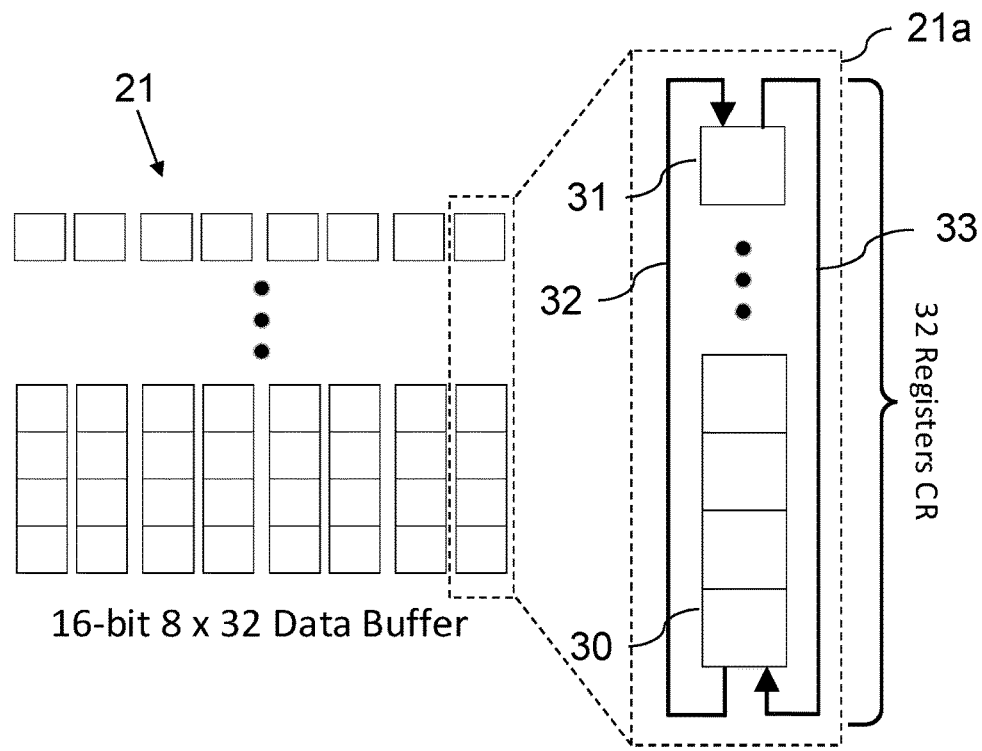
FIG. 3 is a schematic diagram of one of the sets of cyclic registers, plus an enlarged view of a typical cyclic register of the set.

FIG. 3 shows an exemplary CR 21a from the first buffer 21 in more detail. The CR 21a comprises a chain of thirty-two 16-bit registers, including a proximal register 30 (comprising sixteen proximal flip-flops) that is closest to the array 20 (and that can receive data from, and output data to, the array 20), and a distal register 31 (comprising sixteen distal flip-flops) that is furthest from the array 20. It also has a first feedback path 32 for moving a 16-bit register value directly from the proximal register 30 to the distal register 31 (when the CR 21a is in a "forward" flow configuration), and a second feedback path 33 for moving 16-bit register values directly from the distal register 31 to the proximal register 30 (when the CR 21a is in a "backward" flow configuration). When enabled, these feedback paths 32, 33 allow the CR 21a to cycle data round in either direction. All the CRs in both buffers 21, 22 are alike.

At any time, any custom combination of CRs can be enabled for shifting and for read and write operations by the DMA units 7, 8 and by the PE array 20. Configuration data may specify a subset of CRs to be enabled for shifting, while the remaining CRs are not shifted. Data can be injected at the top or bottom of the CRs by the DMA units 7, 8 and by the PE array 20. The feedback paths 32, 33 of any desired subset of the CRs can be activated at run-time as required. Custom latency and read cycles can be defined in software for custom processing.

Each input in the top row of PEs is able to receive output from an end register of any of the CRs in the first buffer 21, and each input in the bottom row of PEs is able to receive output from an end register of any of the CRs in the second buffer 22. However, each output in the bottom row is only able to write to an end register of one corresponding CR in the second buffer 22, and each output in the top row is only able to write to an end register of one corresponding CR in the first buffer 21. (In addition to this, the PE outputs on the top and bottom rows can selectively be fed back to the inputs of the PEs along the opposite edge, instead of or as well as being set to output to their adjacent buffers 21, 22, as described in more details below with reference to FIG. 5.)

The data buffers 21, 22 can be written and read, at their proximal or distal ends, using DMA units 7, 8. The first DMA unit 7 is also responsible for transferring a configuration stream to the PE array 20. The DMA units 7, 8 can transfer data to and from RAM in the data memory 3 in an efficient way even if the target data to be transferred is scattered at many different locations.

The processor 2 sends instructions to the DMA units 7, 8 through control over the APB bus, for loading data from the memory 3 into the array core 6 and for configuring the data buffers 21, 22. Configuration options include: identifying a subset of the CRs in each buffer to be enabled for cycling data; setting the direction of cyclic shift for each buffer; and setting whether the DMA should access data at the top or bottom of each buffer. Selectively enabling a subset of CRs to cycle, while another subset of CRs remain static, can allow for efficient aligning of values across the CRs in a data buffer 21, 22, without requiring circuitry in which every CR can be provided with its own individualised information of how many cycles to shift, which would be more complex and expensive area wise.

The processor 2 also sends compute-related information, defining a desired configuration of the PE array core 6 to perform a particular computation, to the interface unit 12. This information comprises a set of control words for the PE array core 6. These are stored in registers in the interface unit 12, accessible to the control unit 9. Each 32-bit control word comprises fields that determine the direction of cyclic shift for the data buffers 21, 22, the pattern of interconnections between the PEs, the operations to be performed by all the PEs, as well as other cycle accuracy parameters required for the processing of sub-tasks.

Figure 4:
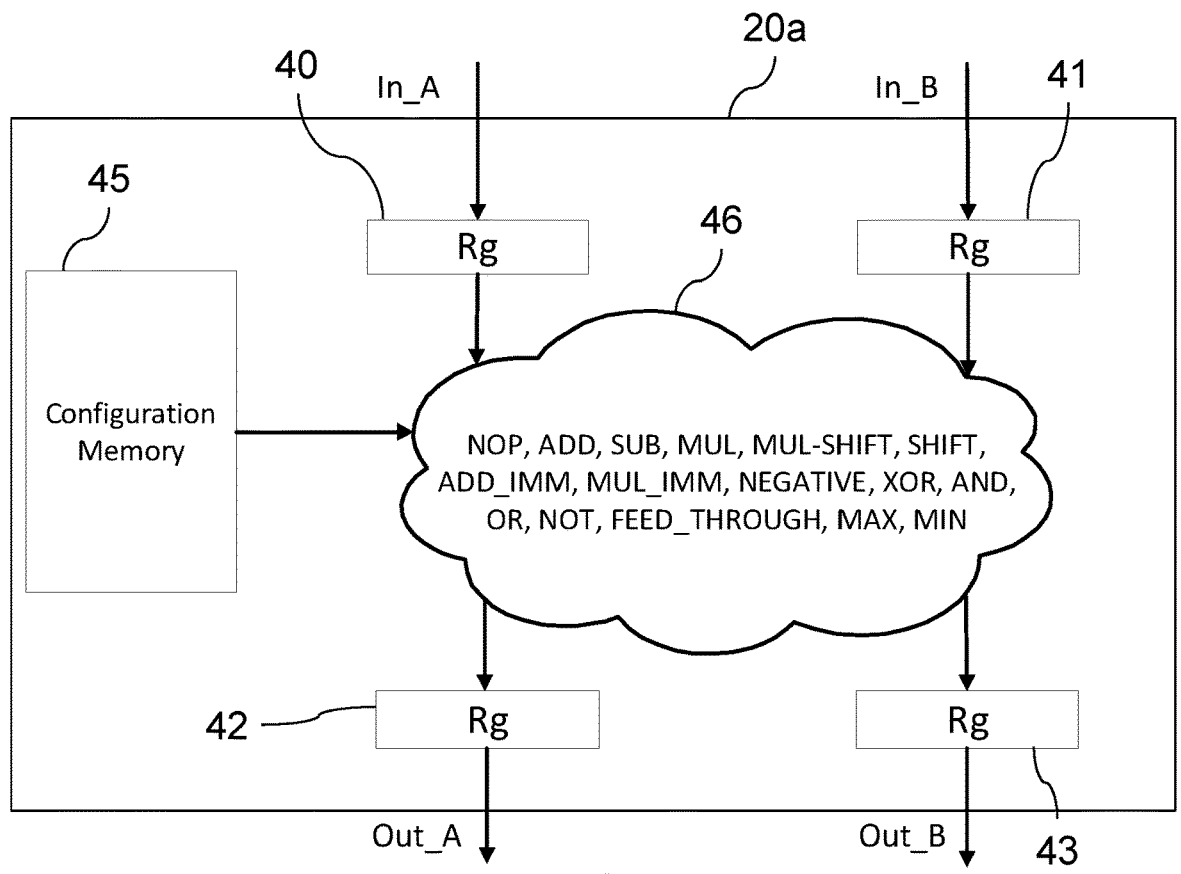
FIG. 4 is a schematic diagram of a typical processing element of the array.

FIG. 4 shows an exemplary PE 20a from the PE array 20 in more detail. All the PEs are physically alike.

Each PE 20a has two data inputs, connected respectively to a first 16-bit input register (In_A) 40 and a second 16-bit input register (In_B) 41, and two data outputs, connected respectively to a first 16-bit output register (Out_A) 42 and a second 16-bit output register (Out_B) 43. (Of course, in other embodiments, the input and output registers may be of different lengths.) It also has a configuration register file 45 for storing configuration data for the digital logic 46 of the PE 20a. Registering the input and output is implemented to prevent combinational loops.

The digital logic 46 in the PE 20a can, at any time, be configured to perform a selected one of sixteen different arithmetic and logic operations for each output 42, 43. The provision of two outputs 42, 43 (rather than just a single output) enables the digital logic 46 to perform two different operations at the same time on the respective inputs or on the same pair of input operands—e.g., a NOT operation on input A to output A and a NEGATIVE operation on input B to output B; or a MAX operation on inputs A & B to output A and a MIN operation on the same inputs A & B to output B. This ability to perform two different operations, potentially on the same pair of inputs, can facilitate particularly efficient implementation of certain operations, such as a radix-2 fast Fourier transform butterfly in which the sum and difference are calculated on the same pair of operands.

The digital logic 46 includes an "immediate" register (16 bits long in this example), which can be loaded with a value when the configuration register file 45 is loaded.

Configuration words stored in the configuration register file 45 select the operation result to be muxed-out at one or both outputs 42, 43.

The table below shows the details of each operation that a PE can perform. The PE can be configured to perform any arbitrary pair of operations, so long as the necessary inputs and outputs are available. In the table, the latency for an operation of a PE is measured in the number of clock cycles and all the arithmetic operations are 2'compliment integer type.

| Name | Operation | Type | Required Inputs | Required Outputs | Latency (cycles) |
|---|---|---|---|---|---|
| NOP | No operation | Logic | A or B | A to A, B to B | 2 |
| ADD | Add | Arithmetic | A and B | A or B | 2 |
| SUB | Subtract | Arithmetic | A and B | A or B | 2 |
| MUL | Multiply | Arithmetic | A and B | A or B | 2 |
| MUL-SHIFT | Multiply and Shift Right | Arith/Logic | A and B | A or B | 2 |
| SHIFT | Shift Right | Logic | A and B | A or B | 2 |
| ADD_IMM | Add to Immediate | Arithmetic | A | A or B | 2 |
| MUL_IMM | Multiply by Immediate | Arithmetic | A | A or B | 2 |
| NEGATIVE | Negation | Logic | A or B | A to A, B to B | 2 |
| XOR | XOR | Logic | A and B | A or B | 2 |
| AND | AND | Logic | A and B | A or B | 2 |
| OR | OR | Logic | A and B | A or B | 2 |
| NOT | NOT | Logic | A or B | A or B | 2 |
| FEED_THROUGH | Feed-Through | Logic | A or B | A to A, B to B | 1 |
| MAX | Maximum | Logic | A and B | A | 2 |
| MIN | Minimum | Logic | A and B | B | 2 |

The MUL-SHIFT operation shifts the product of inputs A and B right by a number of bits set in the immediate register. When the shift size is set appropriately this can enable the product of two 16-bit inputs to be output to a 16-bit output register, in a single operation, while preserving the sixteen most significant bits.

A configuration stream for the array core 6 contains sixteen 32-bit configuration words, one for each of the sixteen PEs. Each word encodes a stream identifier, a PE identifier, two operation identifiers, one for each of the PE outputs, and interconnection settings for the inputs of the PE. Sixteen different configuration streams can be loaded into the hardware accelerator 4 at system start-up time, and then switched between. If an algorithm requires more than sixteen configuration streams, further streams can be loaded at run-time.

Figure 5:
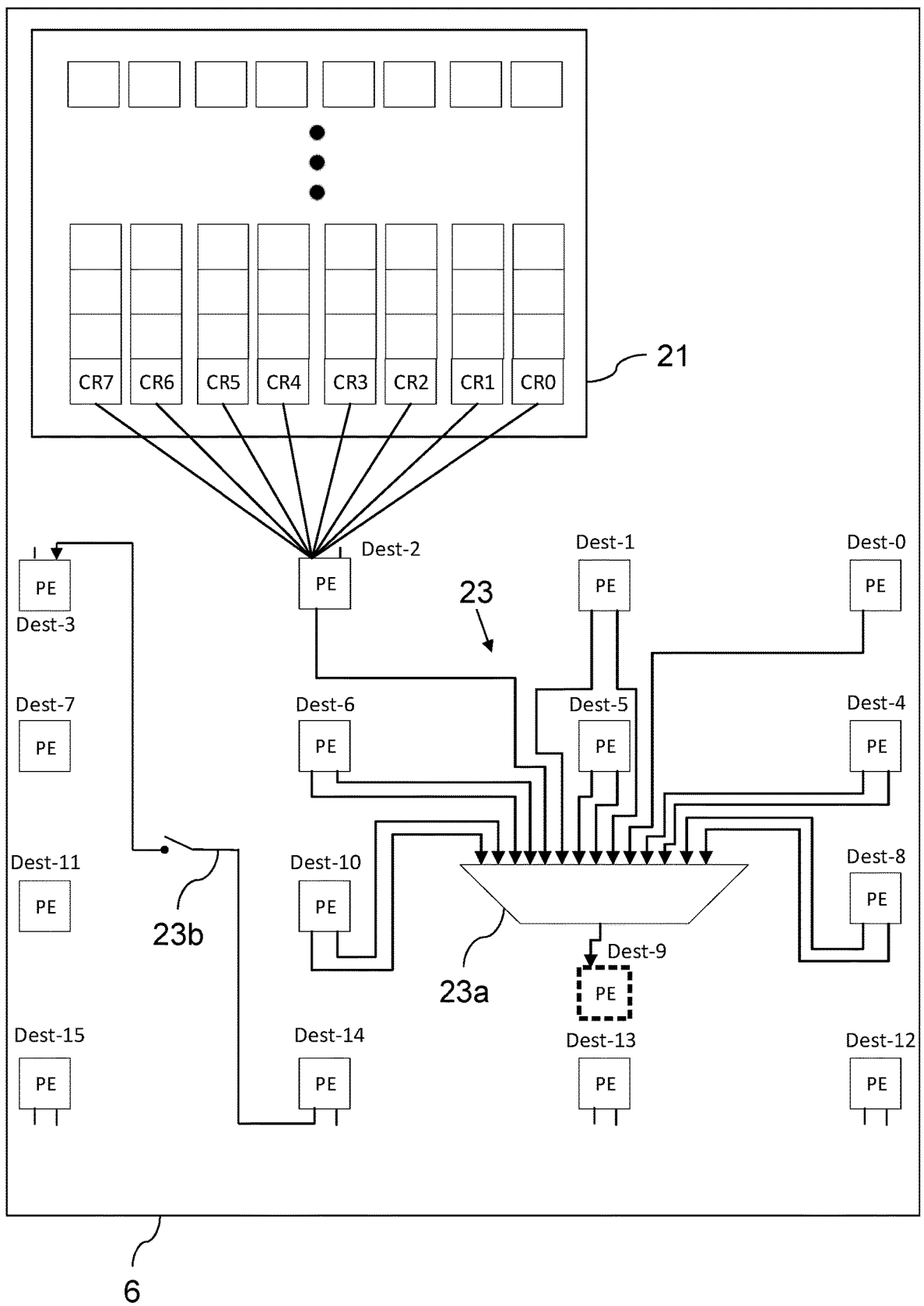
FIG. 5 is a schematic diagram of some of the interconnections in the hardware accelerator.

FIG. 5 shows a representative portion of the configurable interconnect fabric 23. It shows the connection options for the first input (In_A) of an exemplary PE Dest-9, when the array core 20 is configured for data to flow downwards through the array, from top to bottom. The input can be selected through a multiplexer 23a, which is controlled by the configuration data stored in the configuration memory of the PE Dest-9.

The input of the PE Dest-9 is able to receive data from the PEs to its left and right (Dest-10, Dest-8), as well as the PE immediately above (Dest-5) and those to its left and right (Dest-6, Dest-4), and the PE two above (Dest-1) and those to its left and right (Dest-2, Dest-0). The PE Dest-9 also includes a selectable feedback path (not shown here) from each of its own outputs to its own input, to support iterative operations.

Each of the PEs in the array 20 can be similarly configured, albeit with some options not being possible due to the finite size of the array—i.e. for PEs at or near the edges of the array.

The inputs to the PEs in the top two rows (Dest-0 to Dest-7) can also each be configured to receive data from any selected one of the proximal CRs in the first data buffer 21 (CR0-CR7).

Furthermore, the inputs to the PEs in the top row can each be selectively connected to receive an output from any of the PEs in the bottom row. An example of this is shown schematically in FIG. 5 for the top-row PE Dest-3, which can switchably receive, along an array-feedback path 23b to one of its input In_B, a value from one of the outputs Out_A of bottom-row PE Dest-14. In practice, this may be implemented by a connection to a multiplexer input to In_B, which can be programmatically set to pass an input from the data buffer 21 or the feedback path 23b from Dest-14. Although not shown in FIG. 5, the interconnect fabric 23 can be configured to connect any of the bottom-row outputs to any of the top-row inputs. This can allow certain intermediate results to be cycled back through the array without necessarily being output to a data buffer 21, 22.

In some embodiments, the inputs of each PE in the extreme left column can be selectively connected to receive an output from the respective PE in the row above and in the extreme right column. Similarly, the inputs of each PE in the extreme right column may be selectively connectable to receive an output from the respective PE in the row above and in the extreme left column. This may be useful for implementing efficient FIR and IIR configurations.

The interconnect fabric contains sufficient lines and multiplexers to support data flow in either direction. When the flow direction is reversed—i.e. from bottom to top—the connection options are mirrored vertically. For example, the PE Dest-9 can receive data from Dest-8, Dest-9 (itself), Dest-10, Dest-12, Dest-13 and Dest-14, when the flow is from bottom to top. Since it is in the two rows closest to the second data buffer 22, its inputs could also be set to receive data outputs by any selected one of the proximal CRs in the second data buffer 22.

Figure 6:
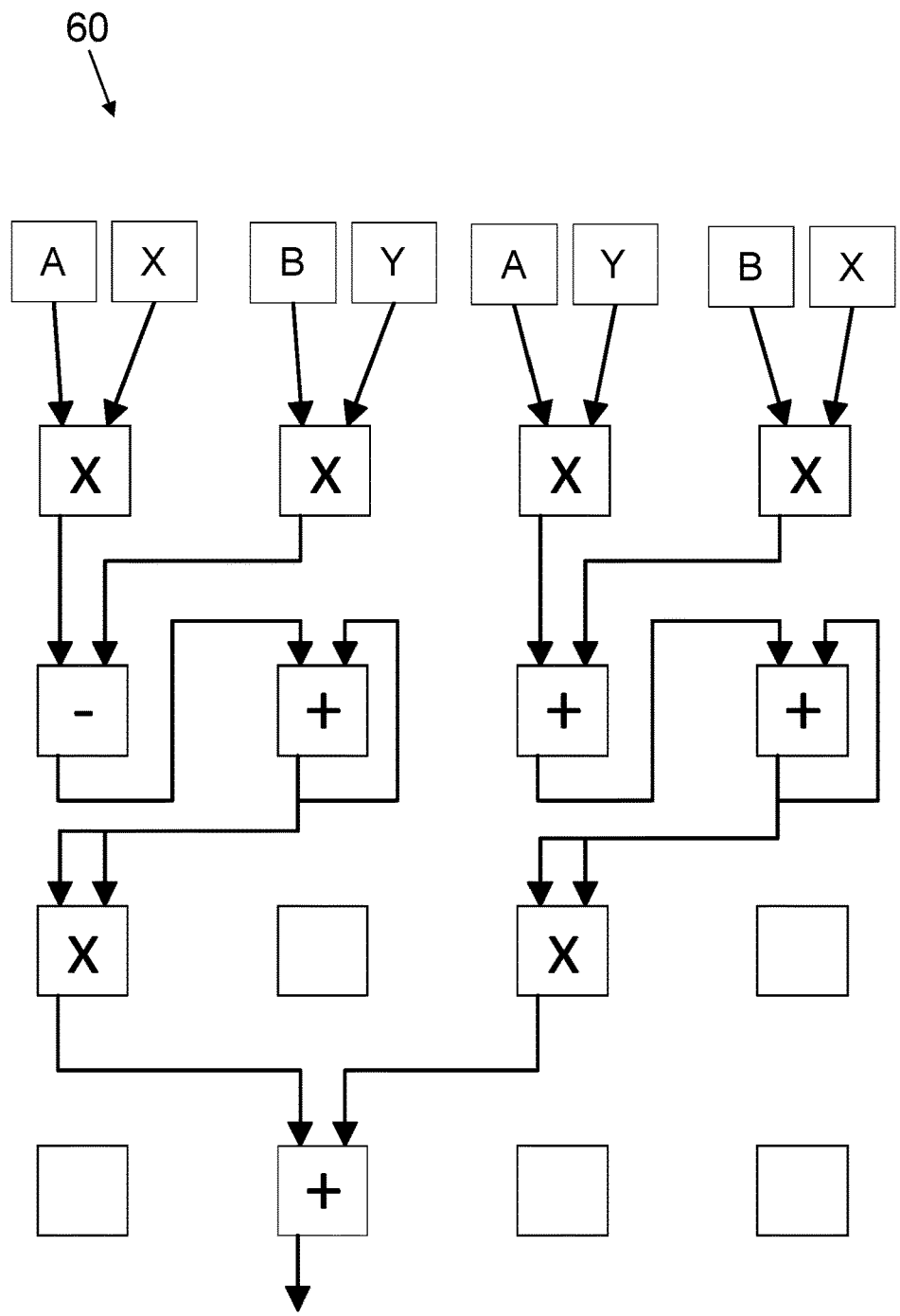
FIG. 6 is a schematic diagram of a configuration of the hardware accelerator for calculating the squared magnitude of sum of product of complex numbers.

FIG. 6 shows an example configuration 60 of the cell array 20, which, when the input-data buffer 21 is loaded with complex coefficients as indicated, calculates the squared magnitude of the sum of a succession of products of pairs of complex numbers, $|\Sigma_k(A_k+iB_k)(X_k+iY_k)|^2$, where successive rows of the input data buffer 21 are indexed by k. Performing a final square-root operation to obtain the magnitude (i.e. absolute value), $|\Sigma_k(A_k+iB_k)(X_k+iY_k)|$, is expensive, and so is not done in this example; the squared magnitude is sufficient for many purposes (e.g. when comparing magnitudes).

In some situations, it may be useful to multiply a long stream of complex sample values by a fixed set of 32 or fewer complex constants repeatedly. In this case, the CRs containing the constant values may be controlled at run-time to cycle the constants round repeatedly, at the same time as the first DMA unit 7 feeds the linear stream of sample values into other CRs that are controlled so as not to cycle their contents round (i.e. that are set to act like simple shift registers).

Figure 7:
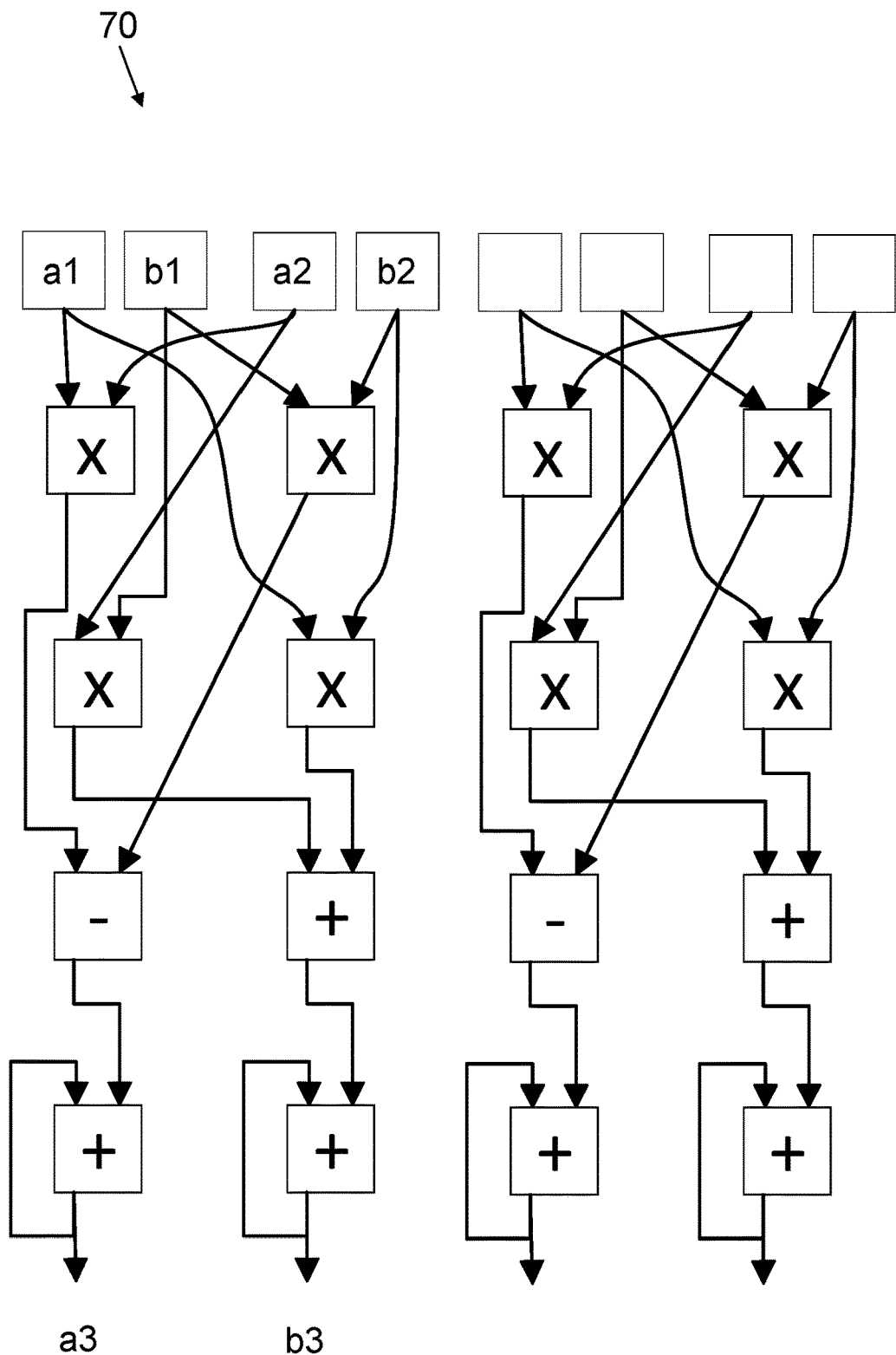
FIG. 7 is a schematic diagram of a configuration of the hardware accelerator for performing a complex double correlation.

FIG. 7 shows an example configuration 70 of the cell array 20, which can be used to perform two complex correlation operations in parallel, on data fed into the array 20 from the input data buffer 21. In particular, the left-half eight PEs will, when loaded with the coefficients $a1_k$, $b1_k$, $a2_k$, $b2_k$ of the complex numbers $X_k=a1_k+ib1_k$ and $Y_k=a2_k+ib2_k$, in k successive rows of the data buffer 21, output the coefficients $a3_n$ and $b3_n$ of $Z_n=a3_n+ib3_n$ such that $$Z_n = \sum_{k=1}^{n} X_k Y_k.$$

The right-half eight PE can independently perform another identical dot product operation in parallel.

Significantly, if one of the set of values (e.g. $Y_k$) is a fixed vector of thirty-two or fewer samples (e.g. representing a predefined constant preamble portion of a radio signal), that is to be cross-correlated against a stream of signal data (e.g. representing samples of an incoming radio signal), the coefficients of the fixed vector can be cycled around the CRs multiple times, without having to be reloaded each time. If the cross-correlation step size is smaller than thirty-two samples, it may also be possible to improve efficiency still further by partially cycling the signal data for each cross-correlation step, while at the same time introducing one or more new signal samples at each cross-correlation step.

Figure 8:
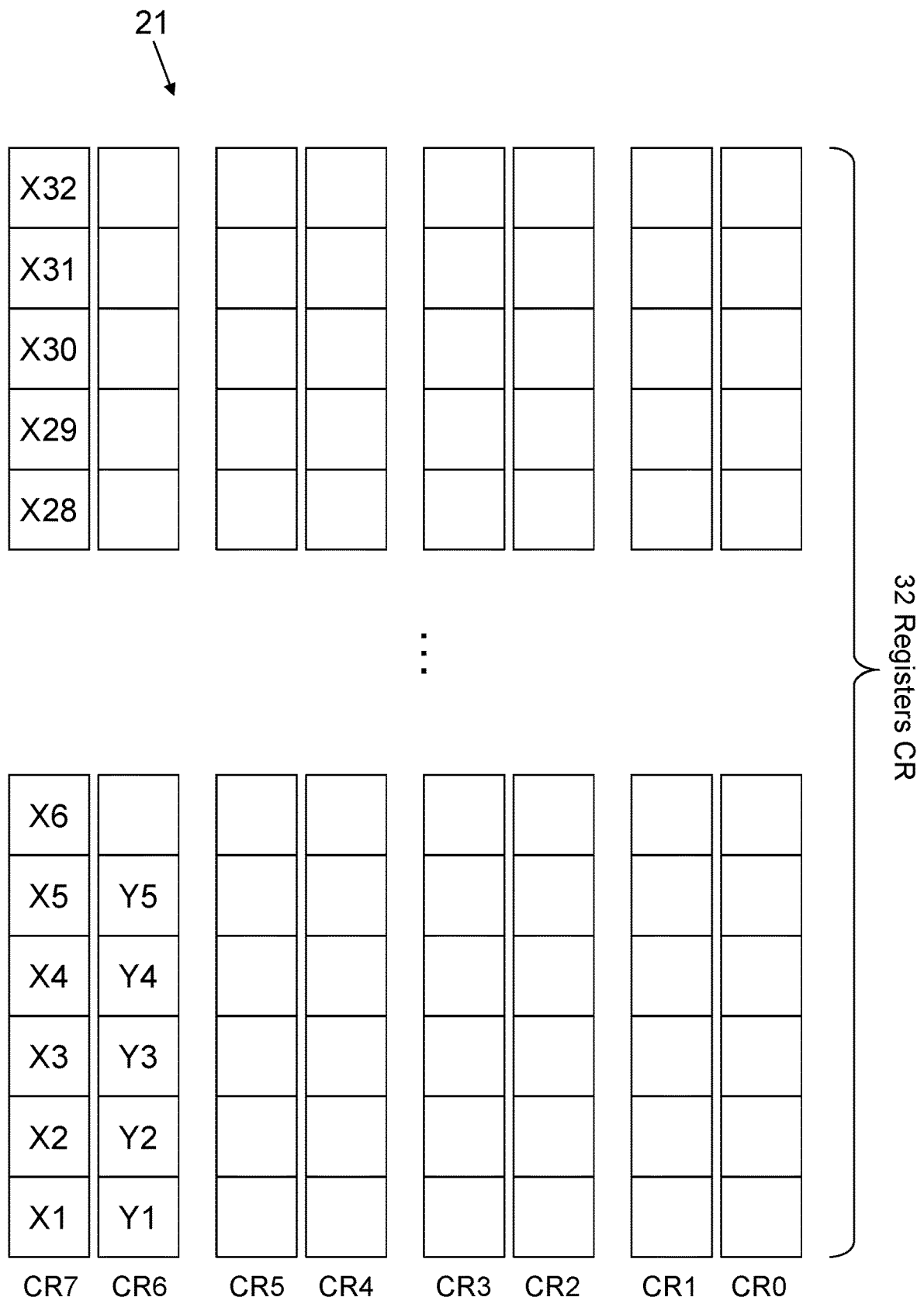
FIG. 8 is a schematic diagram of a state of a data buffer of the hardware accelerator when performing a correlation between two vectors of unequal length, at a point in time.
Figure 9:
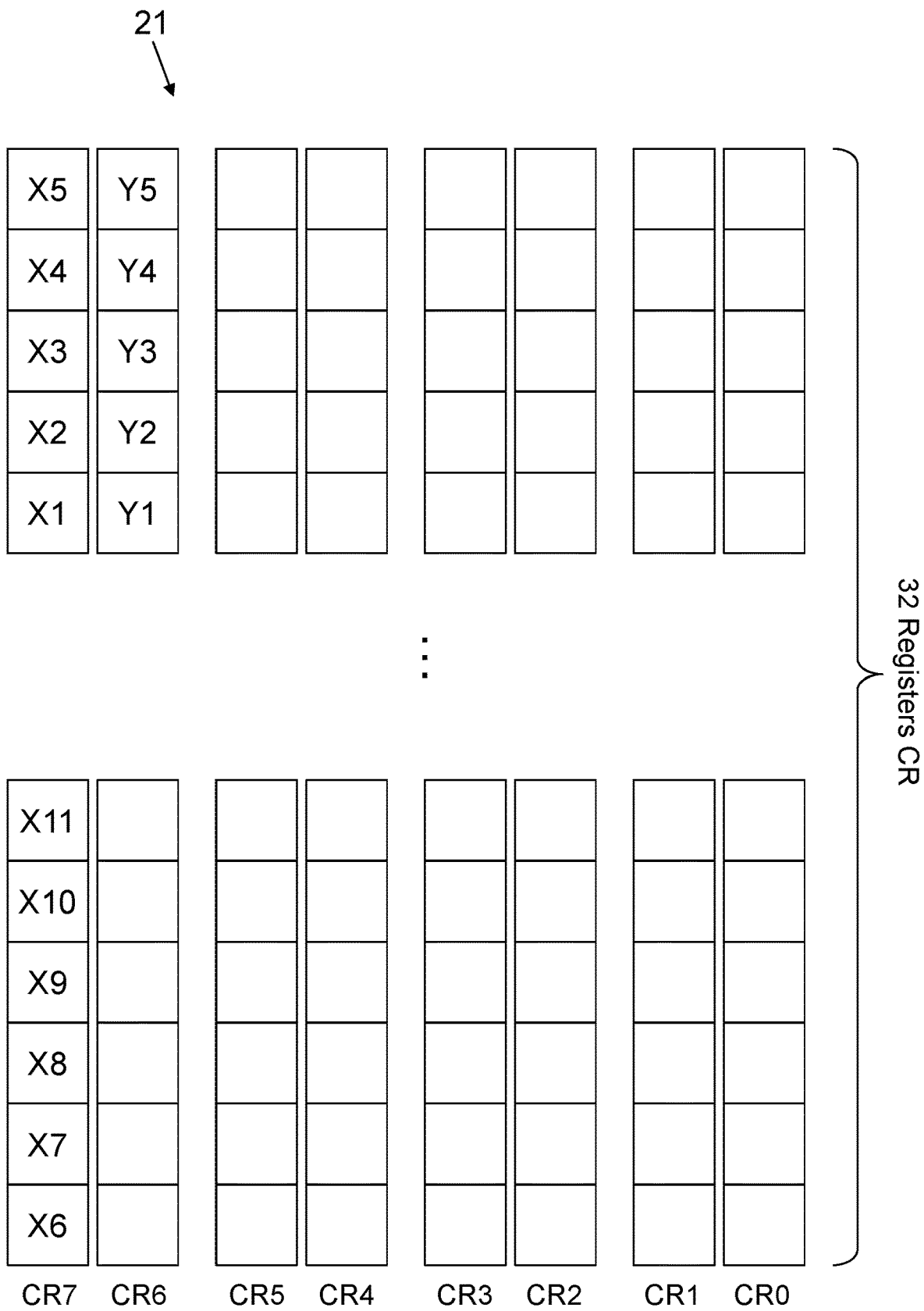
FIG. 9 is a schematic diagram of the state of a data buffer at a later point in time.
Figure 10:
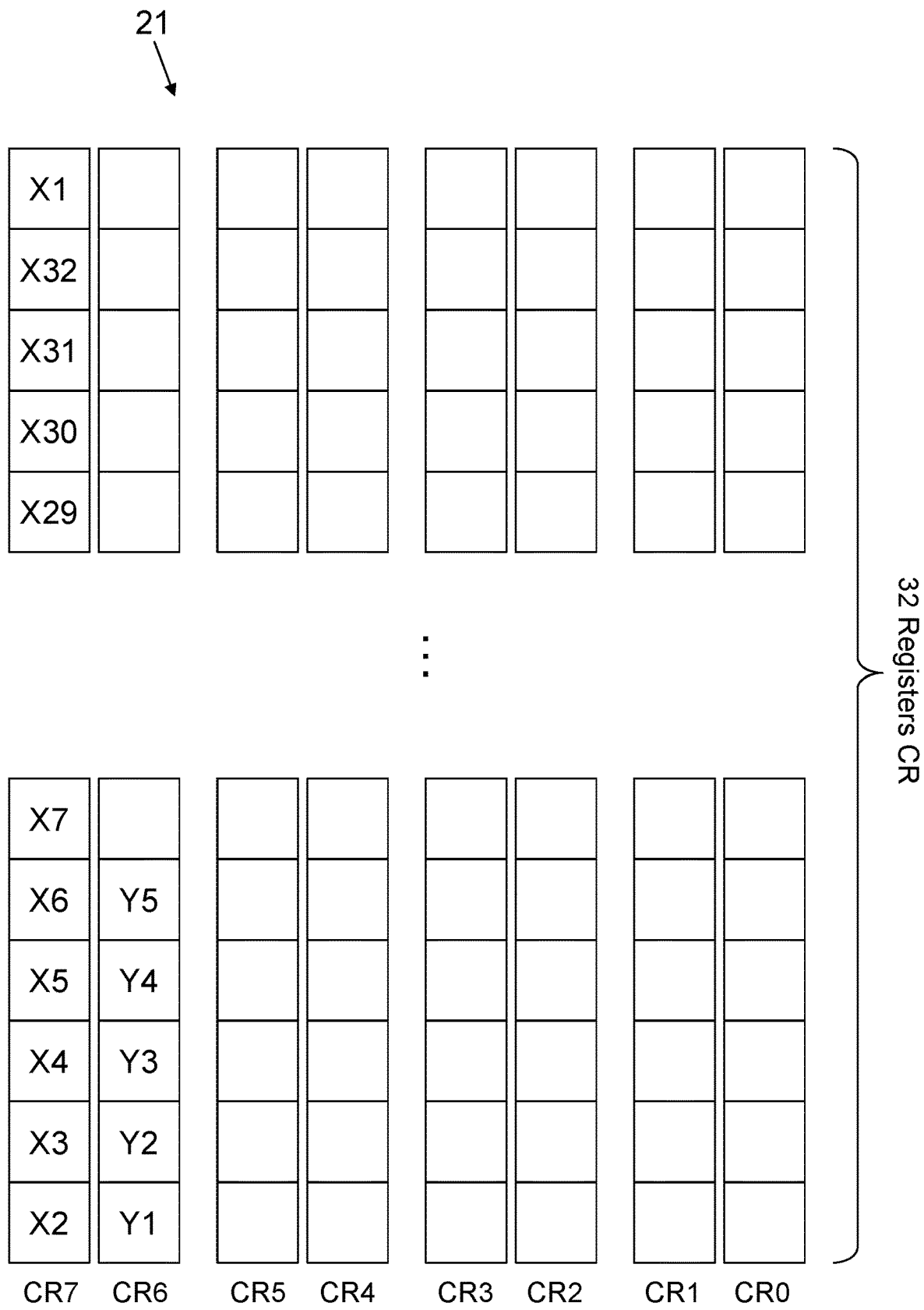
FIG. 10 is a schematic diagram of the state of a data buffer at a still later point in time.

FIGS. 8, 9 and 10 exemplify how reversing the direction of flow can, in some situations, substantially improve efficiency. In this particular example, a cross-correlation is performed between two vectors of values. Bidirectional shifting is performed for efficiently calculating each point of the correlation operation. The number of clock cycles for the correlation process is substantially reduced by making use of the ability to selectively change the direction of flow through individual cyclic registers (CR) 21*a* of the hardware data buffers 21, 22.

In this example, the PE array 20 (not shown) is configured for performing a correlation between two vectors that are of unequal length—a vector X of length thirty-two (e.g. a signal vector) and a vector Y of length five (e.g. a template vector, representing a constant preamble portion of a radio signal).

FIG. 8 shows the data positioning inside the first hardware data buffer 21 at the start of the correlation operation. Register CR7 is filled with the values of vector X, while register CR6 contains the values of vector Y. The first elements, X1 and Y1, of each vector are aligned with each other at the proximal edge of the buffer 21, ready to be input to the PE array 6 in a downward flow direction.

FIG. 9 shows the data positioning of the X and Y vectors within the first hardware data buffer 21 after generating the first point of correlation (the result of which will be stored in the second hardware data buffer 22). The five vector elements X1, X2, X3, X4, X5 and Y1, Y2, Y3, Y4, Y5 of the vectors X and Y have been cycled round (i.e. using a forward-direction feedback path 32) and now reside in the five most distal elements of the registers CR7 and CR6, respectively. The rest of the elements of vector X have been shifted down.

In order to perform the next point of the correlation, it is necessary to bring the five elements of vector Y back to the proximal edge of the register CR6, ready to be input to the PE array 6, alongside elements X2, X3, X4, X5, X6 of vector X, as shown in FIG. 10.

This could be accomplished by performing twenty-eight successive forward-direction (i.e. downwards) register shift operations on the registers CR6 and CR7, plus one further forward shift of just the X vector in register CR7. (The number twenty-eight arises because each CR has thirty-two elements, and the length of vector Y is five, and 32−5=28). However, this would take twenty-nine clock cycles (assuming each shift takes one clock cycle). By exploiting the bidirectionality of the cyclic registers, and reversing the direction of flow so as to cycle the vectors X and Y in a backwards direction (i.e. upwards) and round a backwards-direction feedback path 33, from the distal edge of the buffer 21 to its proximal edge, this process can be reduced to only five shifts of CR6 and four shifts of CR7, taking only five clock cycles.

This forward and backward shifting of vectors X and Y can be repeated until all the correlations points have been computed.

This can result in a substantial clock cycle reduction compared with employing only unidirectional (i.e. forward) cyclic shifting. For a correlation of a 32-point X vector and a 5-point Y vector, the full correlation result would be 32+5+1=38 points long, and would require an overhead (i.e. for realigning the X and Y vectors, not counting the extra shifting required for actually computing the correlation) of 28×38=896 cycles if only unidirectional cyclic shifting is employed, in comparison to only 5×38=160 cycles if bidirectional cyclic shifting is used. So bidirectional feedback can, in this situation, provide a speed-up factor greater than five.

This bidirectional feedback is beneficial whenever the length of one of the vectors is less than half of length of the cyclic register. The CRs in both data buffers 21, 22 may selectably and dynamically be configured for feedforward or feedback shifting, depending on the lengths of the data, and can therefore efficiently operate on data of varying lengths.

Figure 11:
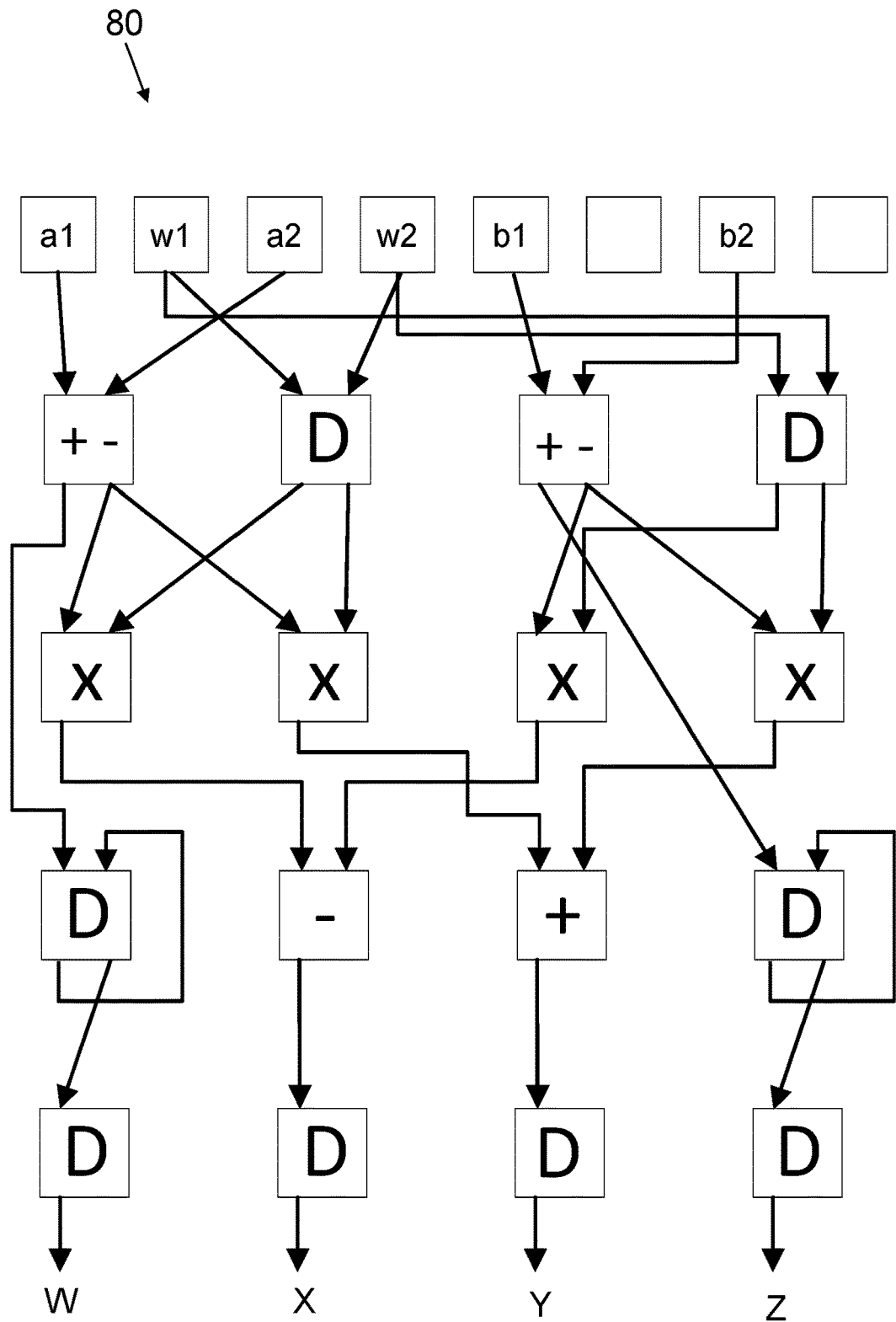
FIG. 11 is a schematic diagram of a configuration of the hardware accelerator for performing a radix-2 FFT butterfly calculation.

FIG. 11 shows an example configuration 80 of the cell array 6, which performs a radix-2 FFT butterfly operation for a 64-point FFT.

The third PE from the left in the top row outputs a sum operation at its first output and a difference operation at its second output, on the same inputs. The PEs labelled "D" simply pass through their inputs with a two-cycle delay—i.e. a NOP.

The output of the first PE on the bottom row is W=a1+a2; of the second PE is X=(a1−a2)w1−(b1−b2)w2; of the third PE is Y=(a1−a2)w2+(b1−b2)w2; and of the fourth PE is Z=b1+b2. The values W+iZ and X+iY are the two outputs of the FFT butterfly operation on a1+ib1 and a2+ib2.

Although the cyclic nature of the cyclic registers is not necessarily exploited when performing an FFT operation, the ability also to perform efficient FFT butterfly operations shows the flexibility of the hardware accelerator in being able to be configured to perform a variety of different processing operations.

As demonstrated, a 4×4 array can be used to implement a number of important signal processing operations (all of which are useful in digital radios, as well as other applications), while also being compact in size. In particular, a 4×4 PE array having PEs that support joint multiply-shift operations provides an elegant way of implementing a radix-2 butterfly in a compact array. However, embodiments are not limited to 4×4 arrays, and arrays of any other dimensions may also be implemented.

It will be appreciated by those skilled in the art that the invention has been illustrated by describing one or more specific embodiments thereof, but is not limited to these embodiments; many variations and modifications are possible, within the scope of the accompanying claims.

The invention claimed is:

1. A hardware accelerator comprising:
a direct memory access system for transferring data between the hardware accelerator and a system memory;
an array of processing elements, each processing element comprising two data inputs and two data outputs and being configured to perform a selectable logical or arithmetic operation on input data received at one or more of the data inputs to generate output data at one or more of the data outputs, wherein the array comprises a set of two or more first-edge processing elements along a first edge of the array and a set of two or more second-edge processing elements, different from the first-edge processing elements, along a second edge of the array;
configurable interconnects for selectively connecting respective outputs of the processing elements to respective inputs of the processing elements;
a first data buffer comprising two or more first-edge cyclic registers, each first-edge cyclic register comprising a plurality of chained flip-flops including a proximal flip-flop and a distal flip-flop, wherein the distal flip-flop of each first-edge cyclic register is arranged for receiving data from the direct memory access system, and wherein the proximal flip-flop of each first-edge cyclic register is selectively connectable to a data input of a respective one of the first-edge processing elements; and
a second data buffer comprising two or more second-edge shift registers, each second-edge shift register comprising a plurality of chained flip-flops including a proximal flip-flop and a distal flip-flop, wherein the proximal flip-flop of each second-edge shift register is selectively connectable to a data output of a respective one of the second-edge processing elements, and wherein the distal flip-flop of each second-edge shift register is arranged for outputting data to the direct memory access system.

2. The hardware accelerator of claim 1, wherein each first-edge cyclic register is bidirectional, comprising a first feedback path for passing data directly from the proximal flip-flop to the distal flip-flop of the cyclic register, and further comprising a second feedback path for passing data directly from the distal flip-flop to the proximal flip-flop of the cyclic register.

3. The hardware accelerator of claim 1, wherein each first-edge cyclic register can be independently configured either to cycle data round the cyclic register, along a direct feedback path from the proximal flip-flop to the distal flip-flop, or not to cycle data round the cyclic register.

4. The hardware accelerator of claim 1, arranged such that a configurable subset of one or more registers of the first and second data buffers can be enabled for shifting while the remaining registers of the first and second data buffers are not shifted.

5. The hardware accelerator of claim 1, wherein:
the first-edge cyclic registers and second-edge shift registers are bidirectional;
the distal flip-flop of each second-edge shift register is arranged for receiving data from the direct memory access system;
the proximal flip-flop of each second-edge shift register is selectively connectable to a data input of a respective one of the second-edge processing elements;
the proximal flip-flop of each first-edge cyclic register is selectively connectable to a data output of a respective one of the first-edge processing elements; and
the distal flip-flop of each first-edge cyclic register is arranged for outputting data to the direct memory access system.

6. The hardware accelerator of claim 1, wherein the configurable interconnects and processing array can be configured, in a first configuration, to process data flowing through the processing array from the first edge to the second edge, and can be configured, in a second configuration, to process data flowing through the processing array from the second edge to the first edge.

7. The hardware accelerator of claim 1, wherein the second-edge shift registers are cyclic registers.

8. The hardware accelerator of claim 7, wherein each of the first-edge cyclic registers and second-edge cyclic registers is bidirectional and can be independently controlled to shift or not shift.

9. The hardware accelerator of claim 1, comprising as many first-edge cyclic registers as there are data inputs to the first-edge processing elements, and as many second-edge shift registers as there are data outputs from the second-edge processing elements.

10. The hardware accelerator of claim 1, wherein each processing element has exactly two data inputs and two data outputs.

11. The hardware accelerator of claim 1, wherein the processing array is a rectangular array, and the first and second edges are opposite edges of the rectangular arrays.

12. The hardware accelerator of claim 9, wherein the processing array has exactly sixteen processing elements in a four-by-four square array.

13. The hardware accelerator of claim 1, wherein the configurable interconnects are arranged so that, for each processing element in the array, each data input of the respective processing element can be connected to any data output of any processing element in a neighbourhood of the respective processing element input, but not to the data output of at least one further processing element in the array.

14. The hardware accelerator of claim 1, wherein the array is rectangular and wherein, for each processing element, each data input of the respective processing element can be connected to any data output of any processing element that is:
the respective processing element itself; or
immediately adjacent the respective processing element and at the same distance from the first edge of the array as the respective processing element; or
one step directly towards the first edge of the array from the respective processing element; or
displaced diagonally from the respective processing element by being one step towards the first edge from the respective processing element and one step away from the respective processing element in a direction parallel to the first edge of the array; or two steps directly towards the first edge of the array from the respective processing element; or displaced diagonally from the respective processing element by being two steps towards the first edge from respective processing element and one step removed from respective processing element in a direction parallel to the first edge.

15. The hardware accelerator of claim 1, wherein the configurable interconnects are arranged such that each processing element on the first edge can be connected to receive an output from any processing element on the second edge.

16. The hardware accelerator of claim 1, wherein each processing element comprises a respective configuration memory and is configured to determine what logical or arithmetic operation to perform on input data received at one or more of the data inputs of the processing element in dependence on configuration data stored in the respective configuration memory, and wherein the respective configuration memory for the processing element is sized to store configuration data identifying exactly one respective operation for each data output of the respective processing element.

17. The hardware accelerator of claim 1, wherein each processing element can be configured to receive a value at a data input of the processing element and to output the value, unchanged, at a data output of the processing element, after a delay that can be configured to have one of two or more different durations.

18. The hardware accelerator of claim 1, wherein each processing element can be configured to output, at a first data output of the processing element, the sum of two values received at the two data inputs, and simultaneously to output, at a second data output of the processing element, the difference of the two values.

19. The hardware accelerator of claim 1, wherein each processing element can be configured to perform a combined multiplication and right-shift operation on two values received at the two data inputs, and to output the answer at a data output of the processing element, wherein the data output is the same number of bits long as each of the two data inputs.

20. An integrated-circuit chip comprising:
a hardware accelerator;
a system memory; and
a bus system,
wherein the hardware accelerator comprises a direct memory access system for transferring data between the hardware accelerator and the system memory;
wherein the bus system connects the system memory to the direct memory access system of the hardware accelerator; and
wherein the hardware accelerator comprises:
an array of processing elements, each processing element comprising two data inputs and two data outputs and being configured to perform a selectable logical or arithmetic operation on input data received at one or more of the data inputs to generate output data at one or more of the data outputs, wherein the array comprises a set of two or more first-edge processing elements along a first edge of the array and a set of two or more second-edge processing elements, different from the first-edge processing elements, along a second edge of the array;
configurable interconnects for selectively connecting respective outputs of the processing elements to respective inputs of the processing elements;
a first data buffer comprising two or more first-edge cyclic registers, each first-edge cyclic register comprising a plurality of chained flip-flops including a proximal flip-flop and a distal flip-flop, wherein the distal flip-flop of each first-edge cyclic register is arranged for receiving data from the direct memory access system, and wherein the proximal flip-flop of each first-edge cyclic register is selectively connectable to a data input of a respective one of the first-edge processing elements; and
a second data buffer comprising two or more second-edge shift registers, each second-edge shift register comprising a plurality of chained flip-flops including a proximal flip-flop and a distal flip-flop, wherein the proximal flip-flop of each second-edge shift register is selectively connectable to a data output of a respective one of the second-edge processing elements, and wherein the distal flip-flop of each second-edge shift register is arranged for outputting data to the direct memory access system.

* * * * *